(12) United States Patent
Irizarry

(10) Patent No.: US 7,904,263 B2
(45) Date of Patent: Mar. 8, 2011

(54) METHOD FOR AUTOMATICALLY DETECTING AND CHARACTERIZING SPECTRAL ACTIVITY

(75) Inventor: Alfredo Vega Irizarry, Rome, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 345 days.

(21) Appl. No.: 12/286,283

(22) Filed: Sep. 24, 2008

(65) Prior Publication Data

US 2009/0299665 A1    Dec. 3, 2009

Related U.S. Application Data

(60) Provisional application No. 61/132,341, filed on May 30, 2008.

(51) Int. Cl.
*G01R 23/16* (2006.01)

(52) U.S. Cl. ......................................................... 702/76

(58) Field of Classification Search .................... 702/76; 375/220, 295, 337, 324; 704/226, 225, 256.3, 704/236, 256; 370/324
See application file for complete search history.

(56) References Cited

U.S. PATENT DOCUMENTS

| 3,733,430 | A | | 5/1973 | Thompson et al. |
| 3,937,899 | A | | 2/1976 | Denemberg |
| 4,904,930 | A | | 2/1990 | Nicholas |
| 5,257,211 | A | | 10/1993 | Noga |
| 6,130,907 | A | * | 10/2000 | Chen .............................. 370/342 |
| 6,269,334 | B1 | * | 7/2001 | Basu et al. ................. 704/256.3 |
| 6,539,351 | B1 | * | 3/2003 | Chen et al. ..................... 704/236 |
| 6,804,648 | B1 | * | 10/2004 | Basu et al. ...................... 704/255 |
| 6,819,731 | B1 | * | 11/2004 | Nooralahiyan ............... 375/377 |
| 7,058,530 | B1 | * | 6/2006 | Miller et al. ..................... 702/76 |
| 7,092,436 | B2 | | 8/2006 | Ma et al. |
| 7,295,972 | B2 | * | 11/2007 | Choi .............................. 704/226 |
| 7,656,963 | B2 | * | 2/2010 | Humphreys et al. .......... 375/295 |
| 2003/0099285 | A1 | * | 5/2003 | Graziano et al. .............. 375/220 |

\* cited by examiner

*Primary Examiner* — Drew A Dunn
*Assistant Examiner* — Xiuquin Sun
(74) *Attorney, Agent, or Firm* — Joseph A. Mancini

(57) ABSTRACT

The invention disclosed herein provides a computer implementable method for characterizing signals in a frequency domain spectrum where such signals may be a wideband signal while individually being of varied formats such as tones, analog modulation, digital modulation, etc. The invention employs statistical probability models where mean, standard deviation, histograms, and probability density functions are analogous to center frequency, bandwidth, frequency spectrum, and signal models, respectively. The invention reconstructs a frequency spectrum showing signals of interest.

8 Claims, 9 Drawing Sheets

| Position (center frequency) | Width (bandwidth) | Amplitude (amplitude) |
|---|---|---|
| 224.4998 | 1.0000 | 0.0278 |
| 336.6583 | 16.0000 | 0.0097 |
| 256.2887 | 28.0000 | 0.0038 |
| 192.4294 | 27.0000 | 0.0039 |

Figure 8

METHOD FOR AUTOMATICALLY DETECTING AND CHARACTERIZING SPECTRAL ACTIVITY

PRIORITY CLAIM UNDER 35 U.S.C. §119(e)

This patent application claims the priority benefit of the filing date of a provisional application Ser. No. 61/132,341, filed in the United States Patent and Trademark Office on May 30, 2008.

STATEMENT OF GOVERNMENT INTEREST

The invention described herein may be manufactured and used by or for the Government for governmental purposes without the payment of any royalty thereon.

BACKGROUND OF THE INVENTION

The objective of the present invention is to determine the presence of signals in the frequency spectrum and characterize them. These signals are typically represented in terms of parameters such as: energy, noise, signal-to-noise ratio (SNR), bandwidth and center frequency.

The prior art has provided spectral estimation techniques where the receiver collects a wide band signal that contains frequency allocated signals in different formats. The wideband signal may contain tones and analog and digital modulation types. Spectral survey estimation methods do a spectral search to identify signals of interests. Thus far, prior art method for the detection of signals requires the use of frequency or time domain techniques.

Referring to FIG. 1, a prior art spectral survey estimator is depicted. The analysis filter bank 10 decomposes the input signal in narrow band channels to produce a spectral estimate. This step can also be accomplished by using DFT based spectral methods. The output of the channels are sent to a spectral survey estimator 20 such as the one presented in [3]. The process estimates the number of signals that are present and determines the corresponding frequency and bandwidth estimates. The estimates are used to recover the individual signals. FIG. 2 depicts the flow of the entire process corresponding to the hardware implementation of FIG. 1.

Prior art methods [1, 2] use time domain techniques that require the use of frequency locking devices. These methods are more suitable for a hardware implementation because phase locking techniques are inefficient when applied for digitized samples [17].

Developments in speech processing, for example, [7] have provided some methodology for classifying speech signal spectra. Basu and other authors acknowledge that a special case of the expectation maximization (EM) method known as Gaussian Mixture Models does not always provide a suitable statistical model. In the case of speech processing, it is important to model heavy tailed distributions. Basu also uses several models of non-Gaussian distributions. This particular distribution has a flatter response and provides the convenience of reducing the complexity of the expectation when the log-likelihood is applied. Basu's method is applied on cepstral vectors which are used for extracting formant and vocal track information. There is no implicit or explicit intention to detect and demultiplex signals.

Referring to FIG. 3, prior art Gaussian Mixture Models (GMM) are a special case of the maximization of expectation process. It defines the model in terms of Gaussian densities. The parameters of the model include: the probability of each mixture element, a vector of the mean and a covariance matrix. While the use of a Gaussian distribution simplifies the maximization of the log-likelihood and produces a matrix equation that is easy to implement, it does not produce acceptable results.

Failings of the Gaussian Mixture Approach for Signal Detection

A frequency spectrum can be treated in the same manner as a mixture of probability density functions. Because the profile of communications signals in the spectrum resembles bell-shape densities (see FIG. 3), a reasonable first choice would be to model signals using Gaussian distributions. In a one-dimensional space, the mixture probability $\alpha$ becomes the amplitude-bandwidth product; the mean $\mu$ becomes the center frequency f; and the standard deviation $\sigma$, the bandwidth b, the data vector $\vec{y}'$ becomes a scalar y'. The data contains the information about the frequencies in the spectrum.

$$\vec{\theta} = [\theta_1\ \theta_2\ \theta_3] = [\alpha\ \mu\ \sigma] \rightarrow [\alpha\ f\ b] \quad \text{Eq. 1}$$

$$p(y'|z';\vec{\theta}) \cdot P(z';\vec{\theta}) = \frac{1}{\sqrt{2\pi}\,\theta_3} \exp\left(-\frac{(y'-\theta_2)^2}{2\theta_3^2}\right) \cdot \theta_1 \quad \text{Eq. 2}$$

The GMM must be adapted to process histograms, or spectral data in this specific case. The approach will consider two sets. The first set describes J' statistical events that represent our known data.

$$Y' = \{y'_j; j=1:J'\} \quad \text{Eq. 3}$$

A second set is defined as the histogram of the set Y'. The bin number (frequency) and the count or weight (amplitude) are represented by the pair $y_j$ and $w_j$ respectively.

$$Y = \{(y_j, w_j) : y_j = \text{bin range}, j=1:J, w_j = \text{count}\} \quad \text{Eq. 4}$$

Associated with each bin $y_j$, there is also a quantity $z_j$ that contains information about the mixture element that corresponds to the bin. The mixture probability or the probability of finding a mixture element k should not be affected by the change of variables as long as both variables z and z' are referring to the same mixture element.

$$P(z'=k;\vec{\theta}) = P(z=k;\vec{\theta}) \quad \text{Eq. 5}$$

The probability of the data $y'_j$ given a mixture element $z'_j$ must be expressed in terms of the new variables $y_j$, $w_j$ and $z_j$. For this purpose, we define a new conditional "probability" $\hat{p}(y_j|z_j=k;\vec{\theta})$ as an average of the probabilities of all the statistical samples $y'_j$ inside the bin $y_j$. It is assumed that events inside a bin share the same variable z.

$$\hat{p}(y_j|z_j=k;\vec{\theta}) \equiv \frac{1}{w_j}\sum_m p(y'_m \subseteq y_j|z'_j=k;\vec{\theta}) \quad \text{Eq. 6}$$

The probability density of the data within a bin given by:

$$\sum_m p(y'_m \subseteq y_j, z_j=k;\vec{\theta}) = w_j \cdot \hat{p}(y_j|z_j=k;\vec{\theta}) \cdot P(z_j=i;\vec{\theta}) \quad \text{Eq. 7}$$

$$\sum_m p(y'_m \subseteq y_j;\vec{\theta}) = \sum_{k=1}^{K} w_j \cdot \hat{p}(y_j|z_j=k;\vec{\theta}) \cdot P(z_j=k;\vec{\theta}) \quad \text{Eq. 8}$$

The new a posteriori probability would take the form of equation 9. The term $w_j$ is cancelled and this leaves an equation that is similar to the original Bayesian estimate.

$$\sum_m p(z_j = i \mid y'_m \subseteq y_j; \vec{\theta}_c) = \frac{\hat{p}(y_j \mid z_j = i; \vec{\theta}_c)P(z_j = i; \vec{\theta}_c)}{\sum_{k=1}^{K} \hat{p}(y_j \mid z_j = k; \vec{\theta}_c) \cdot P(z_j = k; \vec{\theta}_c)} \quad \text{Eq. 9}$$

$$p(z_j = i \mid y_j; \vec{\theta}_c) \equiv \sum_m p(z_j = i \mid y'_m \subseteq y_j; \vec{\theta}_c)$$

With $K$ = number of mixture elements.

The histogram approach can be incorporated into equation 12 as follows:

$$Q(\vec{\theta}) = E_z \left\{ \ln \left( \prod_{j=1}^{J} p(\vec{y}_j \mid \vec{z}; \vec{\theta})^{w_j} \cdot P(\vec{z}; \vec{\theta})^{w_j} \right) \middle| \vec{y} \right\} \quad \text{Eq. 10}$$

It has been assumed that the weight (amplitude) $w_j$ is a positive integer corresponding to the number of repetitions. The proposed process extends the definition of the weights for any positive number. The pair $(y_j, w_j)$ will be used to represent the spectral density with frequency bin $y_j$ and amplitude $w_j$.

The Gaussian-based process was developed using similar steps as those found in [21] and incorporated the modifications of equations 6 through 10. Then the expression was maximized and the formulas for updating the parameters were obtained.

After running several simulations, it was observed that the foregoing Gaussian-based process fails to identify signal parameters or useful features for estimation of the signal parameters. For a Gaussian model, there is no sharp transition between the pass band and the stop band. These wide transitions interfere with ones of the adjacent signals. The process has convergence problems due to the interference between Gaussian mixture elements and the model is not suitable for characterizing communication signals. A new process with a flatter pass band and clear transition between the pass and stop band is needed (see FIG. 6) and provides the motivation for the present invention.

Non-Gaussian Approaches for Spectral Survey

Other probability densities were explored to overcome the limitations and failings of Gaussian-based processes for the estimation of signal parameters. First, a Butterworth filter model was used [Eq. 11]. But this process is not convenient because it produces a combination of complex logarithmic and rational expressions when the expectation is maximized.

$$p(y, z \mid \vec{\theta}) = p(y \mid z; \vec{\theta}) \cdot P(z; \vec{\theta}) = \frac{1}{1 + \left(\frac{y-f}{b}\right)^{2N}} \cdot \alpha \quad \text{Eq. 11}$$

OBJECTS AND SUMMARY OF THE INVENTION

One object of the present invention is to provide a method to determine the presence of signals in the frequency spectrum.

Another object of the present invention is to provide a method that separates signals of interest in the frequency spectrum into respective frequency bands.

Yet another object of the present invention is to apply a statistical process to the detection and categorization of signals of interest.

Still yet another object of the present invention is to adapt statistical parameters to represent the frequency domain parameters of a signal.

The invention disclosed herein provides a method for characterizing signals in a frequency domain spectrum where such signals may comprise a wideband signal individually composed of varied formats such as tones, analog modulation, digital modulation, etc. The present invention employs statistical probability models where mean, standard deviation, histograms, and probability density functions are analogous to center frequency, bandwidth, frequency spectrum, and signal models, respectively.

Advantages and New Features of the Present Invention

The present invention performs spectral survey estimation using a novel approach based in a statistical method known as expectation maximization. Within the context of this invention the terms "mixture elements", "mean", "standard deviation" and "histogram" are the statistical probability density equivalents of "sub band", "center frequency", "bandwidth" and "spectrum" in the frequency domain. Spectral survey should not be confused with channel estimation. The goal of channel estimation is to characterize the channel in terms of parameters like bandwidth, center frequency, delay, distortion and noise [2, 8, 11]. In the case of spectral survey, the attention is focused on the signal profile rather than the channel effects. Channel estimation is used to mitigate the channel effects on the received signal while spectral survey is used for demultiplexing signals in the spectrum.

The present invention, unlike prior art methods including those that employ Gaussian Mixture Models (see FIG. 3) features additional novel steps that allow processing the frequency spectrum, ensuring convergence to optimal solutions and working independently of the number of signals that may be present in the spectrum. Unlike prior art speech classification techniques, the present invention does not perform signal classification or training for classification. The method used in the present invention is a novel type of curve fitting that matches the spectral signals to a parameterized spectral model. FIG. 4 depicts a frequency spectrum with MPSK, MFSK and tone signals. FIG. 5 depicts the application of the present invention to the frequency spectrum of FIG. 4. The outputs of the process are amplitude, bandwidth and center frequency. When this process is combined with efficient filter banks, other parameters such as SNR and energy can be estimated. If an analytical solution to the maximization problem is not feasible, an alternative numerical method using Newton's algorithm can be developed [15].

The present invention treats the frequency spectrum as a histogram. A broadband spectrum can be seen as a mixture of density distributions. The statistical parameters could be adapted to represent the parameters of a signal.

The present invention employs several novel steps to deal with spectral information. After selecting a statistical model, the maximization of the expectation is found by means of a numerical approximation. The process is initialized and a suboptimal solution is found. Further processing is required to identify the trivial and suboptimal solutions before reconstructing the spectral profile of the signals. With the aid of efficient filter banks, parameter estimation of energy, noise floor and SNR can be derived. One possible embodiment of the present invention is disclosed herein. It is possible to replace the maximization of expectation estimation process with a maximum likelihood estimation process [10] and obtain similar results. In a similar manner, there are numerous ways to perform spectral power estimation [18] and achieving similar results.

Theory Underlying the Present Invention
Development of the Method

The expectation of the log-likelihood $Q(\vec{\theta})$ is defined in terms of the expected value $E_z\{\ \}$, the known data vector $\vec{y}'$, the variable $z'$ that identifies the mixture element, the parameter vector $\vec{\theta}$ and the joint probability of the data and the mixture element $p(\vec{y}',z';\vec{\theta}) = p(\vec{y}'|z';\vec{\theta}) \cdot P(z';\vec{\theta})$. The equations follow a similar notation as in [17].

$$Q(\vec{\theta}) = E_z\left\{\ln\left(\prod_{j=1}^{J'} p(\vec{y}'_j | \vec{z}'; \vec{\theta}) \cdot P(\vec{z}'; \vec{\theta})\right) \middle| \vec{y}'\right\} \quad \text{Eq. 12}$$

$$Q(\vec{\theta}) = \sum_{i=1}^{I} \sum_{j=1}^{J} p(z'_j = i | \vec{y}'_j; \vec{\theta}_t) \cdot \ln(p(\vec{y}'_j | z'_j = i; \vec{\theta}) \cdot P(z'_j = i; \vec{\theta})) \quad \text{Eq. 13}$$

In Equation 13, $\vec{\theta}_t$ is part of the expectation operator and will be treated as a constant during the maximization process. For a known data set $Y' = \{\vec{y}'_j; j=1: J'\}$, the best model for $\vec{z}' = [z'_1 \ldots z'_J]$ is found when the likelihood of the expectation is maximized with respect to its parameter vector $\vec{\theta}$. Finding the maximum expectation requires the determination of the root of the derivates of the likelihood with respect to each parameter [Eq. 14, 15].

$$\nabla_{\vec{\theta}} Q(\theta) = 0 \rightarrow \frac{\partial Q(\vec{\theta})}{\partial \theta_i} = 0 \quad \text{Eq. 14}$$

$$\vec{\theta} = [\theta_1 \ \theta_2 \ \ldots \ \theta_N]^T \quad \text{Eq. 15}$$

REFERENCES

Patents:
[1] U.S. Pat. No. 3,733,430 (Thompson et al.)
[2] U.S. Pat. No. 7,092,436 (Ma et al.)
[3] U.S. Pat. No. 5,257,211 (Noga)
[4] U.S. Pat. No. 4,904,930 (Nicholas)
[5] U.S. Pat. No. 6,819,731 (Nooralahiyan)
[6] U.S. Pat. No. 3,937,899 (Denemberg)
[7] U.S. Pat. No. 6,269,334 (Basu et al.)
Publications:
[8] A. Ansari, R. Viswanathan; Application of Expectation Maximization Algorithm to the Detection of a Direct-Sequence Signal in Pulse Noise Jamming, IEEE Transactions on Communications, Vol 41. No. 8 Aug. 1993
[9] V. Bhatia, B. Mulgrew; A EM-Kernel Density Method for Channel Estimation in Non-Gaussian Noise; IEEE Magazine, July 2004, pg. 3871-3875
[10] R. Duda, Pattern Classification, $2^{nd}$ Edition, John Wiley and Sons, 2001
[11] J. Kim, H. Shin; Multiuser Channel Estimation Using Gaussian Mixture Sigma Point Particle Filter for CDMA System; Institute of Electronics, Information and Communication Engineers (IEICE) Transactions on Communications; Vol E89-B; Nov. 8, 2006, pg. 3148-3151.
[12] R. Iltis, S. Kim; Geometric Derivation of Expectation-Maximization and Generalized Sucessive Interference Cancellation Algorithms With Applications to CDMA Channel Estimation; IEEE Transaction on Signal Processing, Vol 51, May 5, 2003, pg. 1367-1377.
[13] A. Lemma; Blind Signal Bandwidth Estimation Using a Joint Angle-Frequency Estimation Algorithm; IEEE/Pro-RISC99 STW, 1999, pg. 269-273.
[14] J. Masson, Z. Picel; Flexible Design of Computationally Efficient Nearly Perfect QMF Filter Banks, IEEE Magazine, August 1985, pg. 541-544
[15] G. McLachlan, T. Krishnan, The EM Algorithm and Extensions, $2^{nd}$ Edition, John Wiley & Sons, 2008.
[16] T. Moon; The Expectation Maximization Algorithm, IEEE Signal Processing Magazine; Vol 13, No. 6, November 1996, pg. 47-64.
[17] A. Noga; Methods for Discrete-Time Phase and Frequency Synchronization; DTIC, AFRL In-House Report AFRL-IF-RS-TR-1999-133
[18] A. Oppenheim, R. Schafer, Discrete-Time Signal Processing, $2^{nd}$ Edition, Prentice Hall, 1999, pg. 693-755
[19] S. Theodoridis, K. Koutroumbas; Pattern Recognition $3^{rd}$ Edition, Elsevier, 2006
[20] J. Wang, J. Lee, C. Zhang; Kernel GMM and its Application to Image Binarization; IEEE ICME, September 2003, pg. 533-535.
[21] Wikipedia.org, Expectation-Maximization Algorithm

BRIEF DESCRIPTION OF THE DRAWINGS

FIG. 8 depicts test results produced by the present invention where input signals comprised MPSK, MFSK and tone signals at different frequencies and noise levels.

DETAILED DESCRIPTION OF THE PREFERRED EMBODIMENT

The present invention utilizes a novel process to model spectral signals with a specialized probability density function. The equivalence between statistical terms and frequency domain terms was previously stated, but more specifically, a "mixture" is a multimodal pdf. A "mixture element" is an element of the multimodal probability density function (pdf). A "sub band" is a suboptimal solution produced by the modified EM algorithm (Signal Mixture Models Algorithm). It is equivalent to "mixture element", but in the context of signals. It identifies a portion of the spectrum that contains energy from a signal. A "band" is a combination adjacent "sub bands" and represents the actual signals in the spectrum. There is a decision process used to combine "sub bands". The ultimate goal is to identify each band in terms of the center frequency and bandwidth.

The process [Eq. 16] provides simplification over other densities when using the log-likelihood expression. The process allows detecting and estimating the center frequency and bandwidth.

$$p(y, z \mid \vec{\theta}) = p(y \mid z; \vec{\theta}) \cdot P(z; \vec{\theta}) = \frac{N}{b \cdot \Gamma\left(\frac{1}{N}\right)} \exp\left(-\left(\frac{y-f}{b/2}\right)^N\right) \cdot \alpha \quad \text{Eq. 16}$$

Where, N is an even positive integer and f, b and $\alpha = P(z; \vec{\theta})$ are positive quantities.

Initialization of the Process

Figure 9:
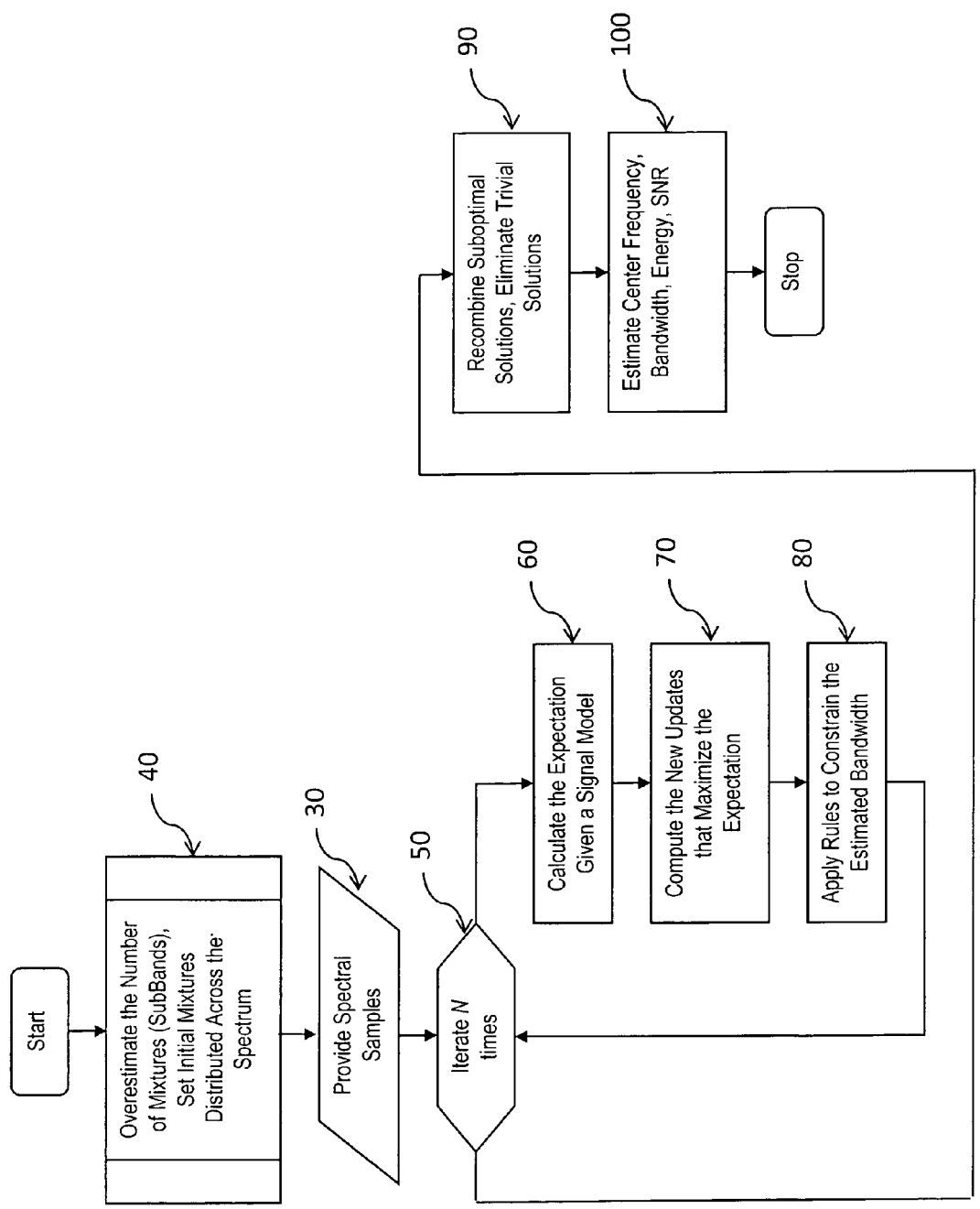
FIG. 9 depicts the process steps for the present invention for implementation in software or firmware code to run on a digital computer or digital hardware.

Referring to FIG. 9, a flow diagram depicting the process steps that may be coded in software to run on a computer or hardware, the maximum number of detectable mixture elements is controlled by overestimating 40 the number of mixture elements. For the embodiment presented herein, the mixture elements equals one third of the number of frequency bins. The mixtures elements that do not converge to a signal profile would vanish and become trivial solutions. Those mixture elements that converge to a non-trivial solution would produce whole bands or sub-bands (overlapping or adjacent bands). These bands need to be reconstructed by implementing post processing rules after achieving convergence.

The performance of search process usually depends on the initial estimate. To accelerate the convergence, the method allocates initial mixture uniformly distributed mixture elements across the entire spectrum 40.

The Maximization Step

The process of maximizing the expectation requires finding the roots of its derivative with respect to all the parameters of the model. The set of equations can be expressed in terms of a new and novel model:

$$Q(\vec{\theta}) = \sum_{i=1}^{K} \sum_{j=1}^{J} p(z_j = i \mid y_j; \vec{\theta}_t) \cdot \quad \text{Eq. 17}$$

$$\left\{ \begin{array}{l} -w_j \ln(b_i) + w_j \ln\left(\frac{N}{\Gamma(1/N)}\right) - w_j \cdot \left(2 \cdot \frac{(y_j - f_i)}{b_i}\right)^N - \\ w_j \cdot \ln(p(z_j = i; \vec{\theta}_c)) - \lambda\left(\sum_{j=1}^{J} P(z_j = i; \vec{\theta}_c) - 1\right) \end{array} \right\}$$

$$\sum_{j=1}^{J} p(z_j = i; \vec{\theta}) = 1, \lambda \text{ is a Lagrange multiplier}$$

The root of each equation becomes the updated parameter and the process can be iterated until convergence is reached.

$$\frac{\partial Q(\vec{\theta})}{\partial f_i} = \sum_{j=1}^{J} p(z_j = i \mid y_j; \vec{\theta}_c) \cdot \left(-N \cdot w_j \cdot \frac{(y_j - f_i)^{N-1}}{(b_i/2)^N}\right) = 0 \quad \text{Eq. 18}$$

-continued $$\frac{\partial Q(\vec{\theta})}{\partial b_i} = \sum_{j=1}^{J} p(z_j = i \mid y_j; \vec{\theta}_c) \cdot \left(\frac{1}{b_i} - 2N \cdot \frac{(y_j - f_i)^N}{(b_i/2)^{N+1}}\right) = 0 \quad \text{Eq. 19}$$

$$\frac{\partial Q(\vec{\theta})}{\partial \alpha_i} = \sum_{j=1}^{J} p(z_j = i \mid y_j; \vec{\theta}) \cdot \left(\frac{w_j}{p(z_j = i; \vec{\theta})} - \lambda\right) = 0, \quad \text{Eq. 20}$$

$$\alpha_i = \frac{\sum_{j=1}^{J} p(z_j = i \mid y_j; \vec{\theta}_c) \cdot w_j}{\sum_{k=1}^{K} \sum_{j=1}^{J} p(z_j = i \mid y_j; \vec{\theta}_c) \cdot w_j} \quad \text{Eq. 21}$$

The root of equations 18 and 19 can be calculated by means of the Newton's Algorithm for finding roots after taking the second derivative of the equations shown above. [Eq. 22, 23] The updated parameter $\hat{\theta}_k$ is given by equation 24.

$$F_k^{(1)}(\vec{\theta}) = \frac{\partial Q(\vec{\theta})}{\partial \theta_k} \quad \text{Eq. 22}$$

$$F_k^{(2)}(\vec{\theta}) = \frac{\partial^2 Q(\vec{\theta})}{\partial \theta_k^2} \quad \text{Eq. 23}$$

$$\hat{\theta}_k = \theta_k - \frac{F_k^{(1)}(\vec{\theta})}{F_k^{(2)}(\vec{\theta})} \quad \text{Eq. 24}$$

Expectation, Maximization and Rules

After the initialization, the process iterates 50 several times until convergence is reached. The one embodiment of the present invention required 25 iterations (see FIG. 7) to form the spectral profile.

Figure 1:
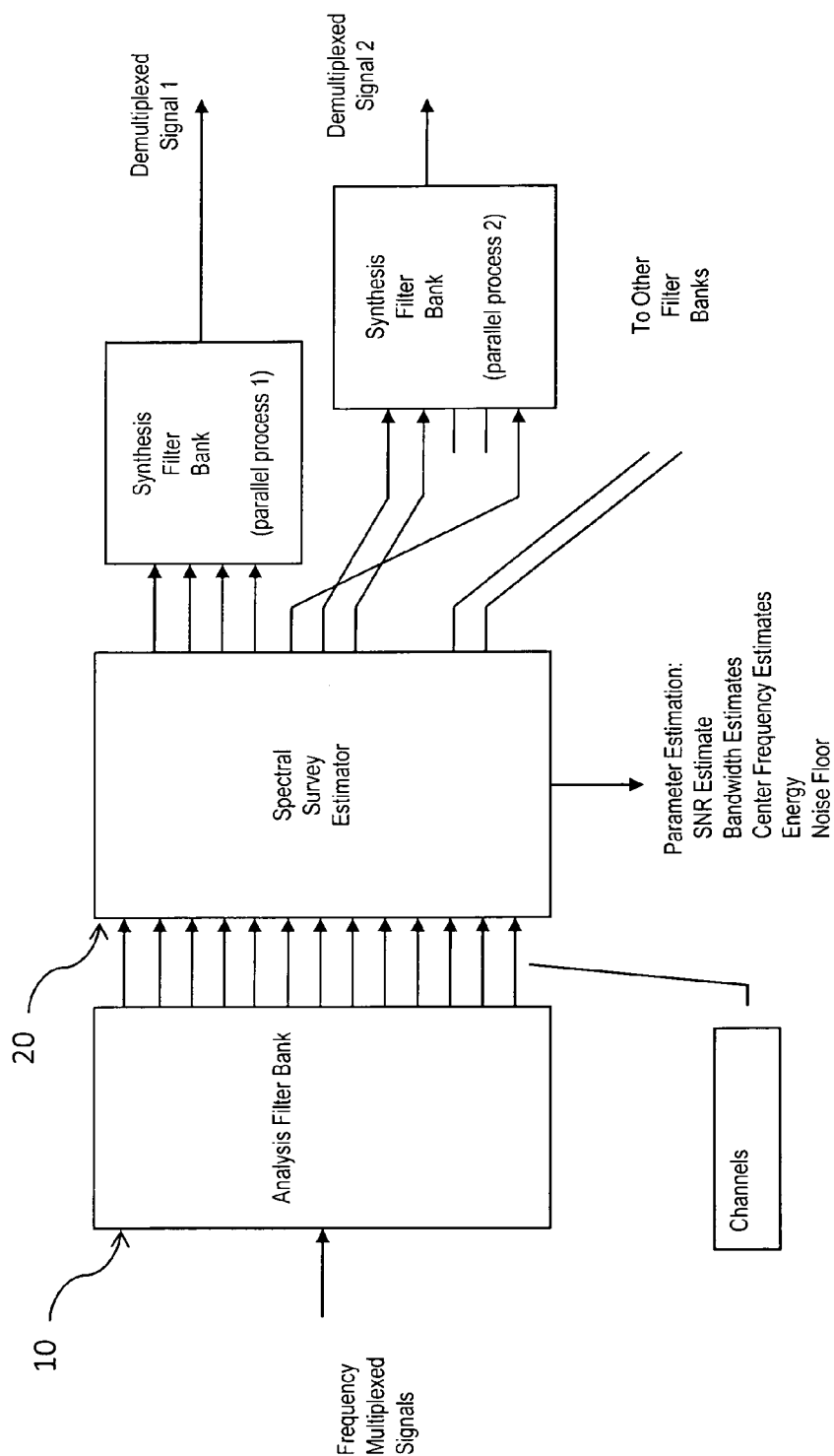
FIG. 1 depicts a prior art spectral survey estimator.
Figure 2:
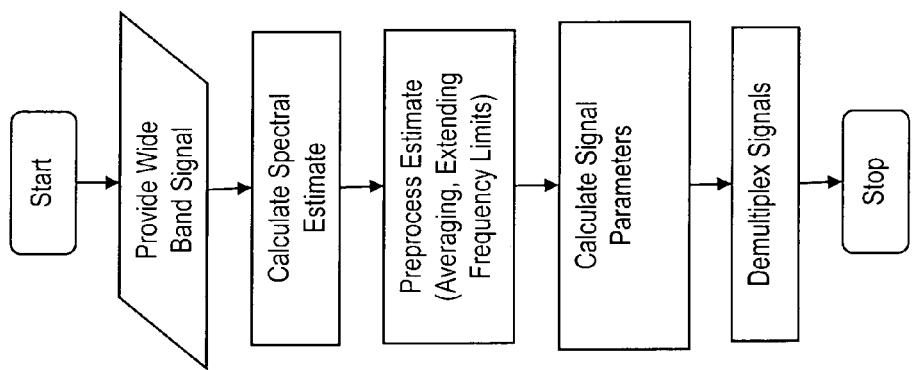
FIG. 2 depicts a process flowchart corresponding to prior art spectral survey estimators.
Figure 3:
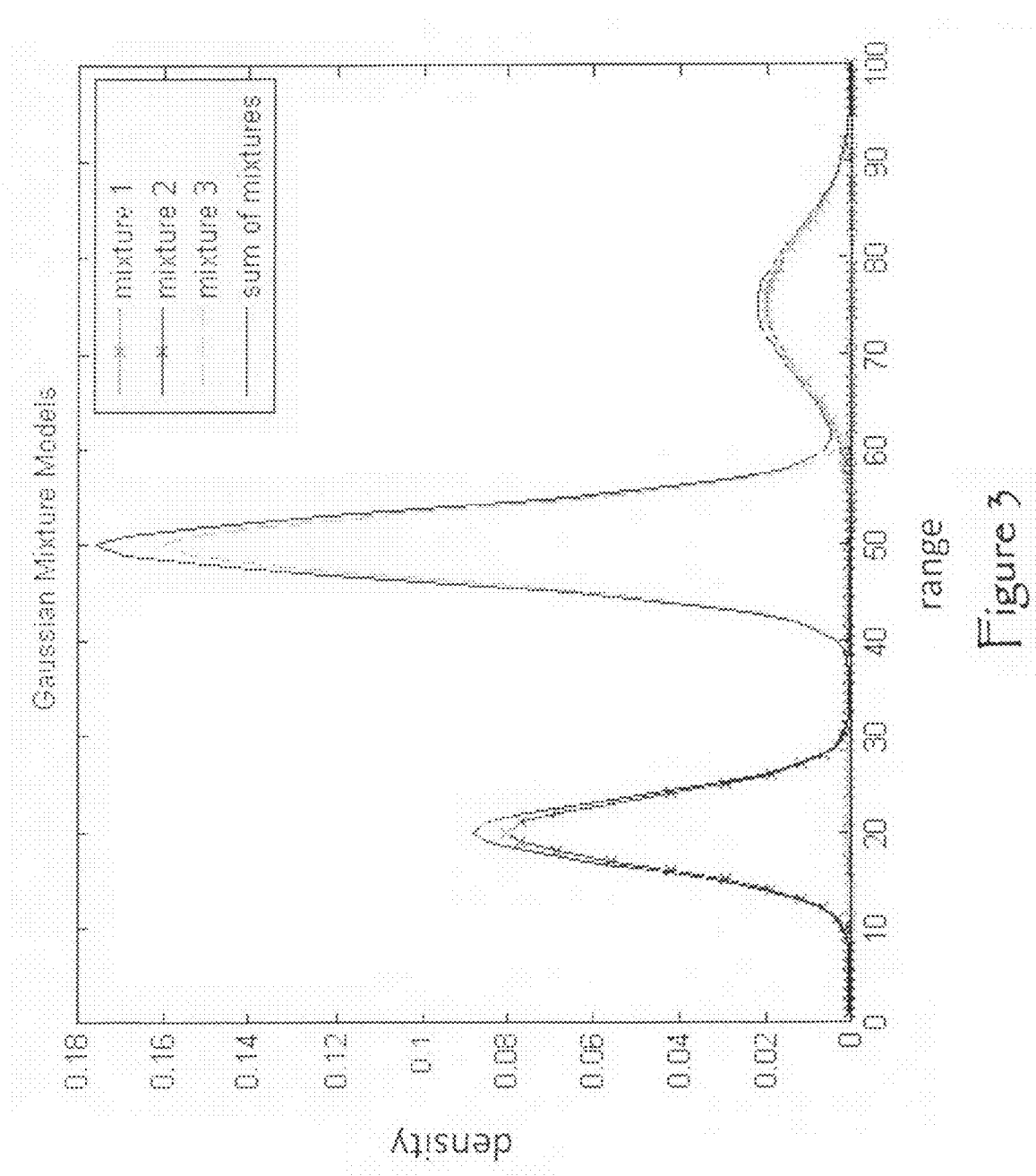
FIG. 3 depicts a Gaussian probability density function referred to as Gaussian mixture model.
Figure 4:
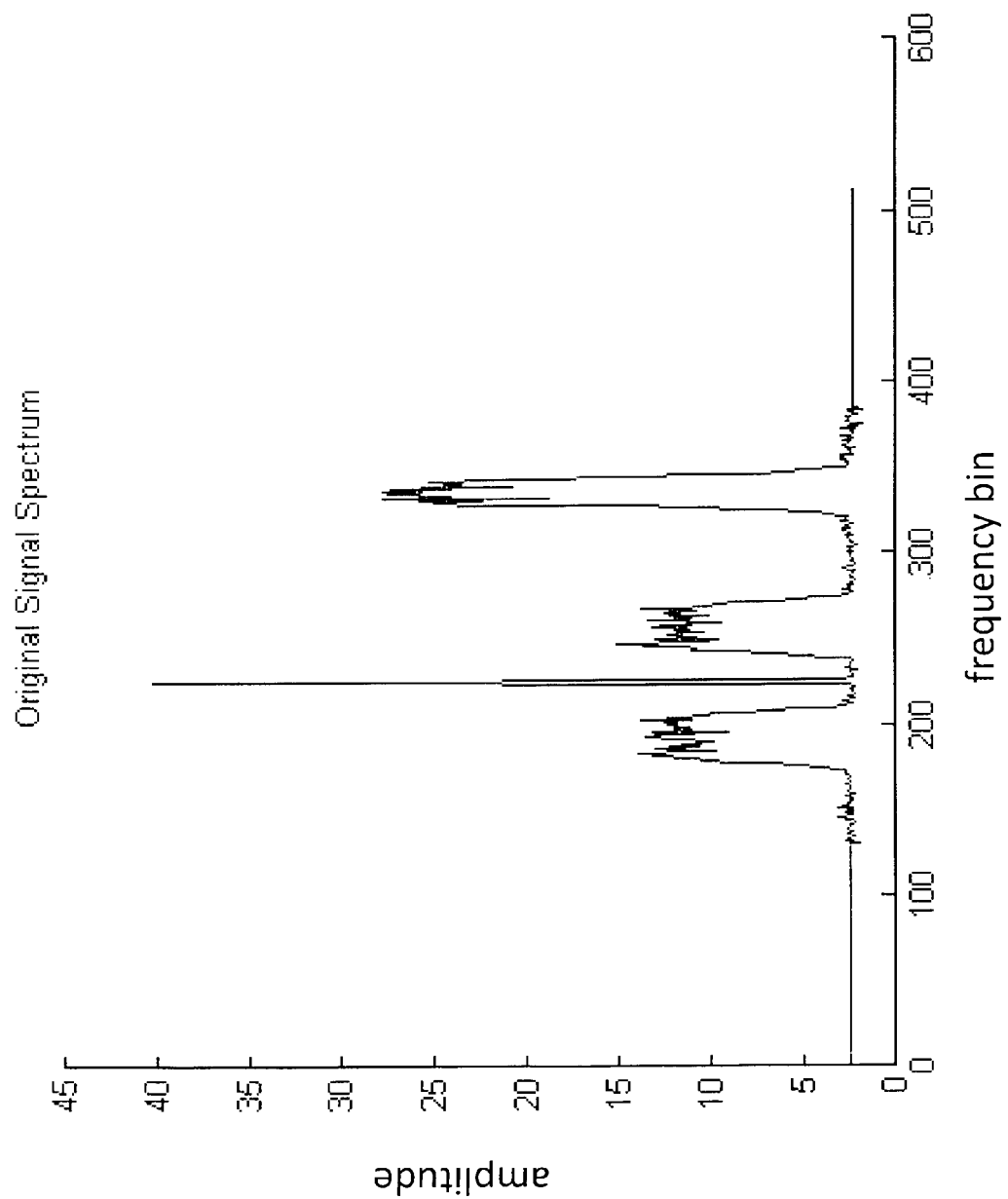
FIG. 4 depicts a frequency spectrum containing MPSK, MFSK and tone signals.
Figure 5:
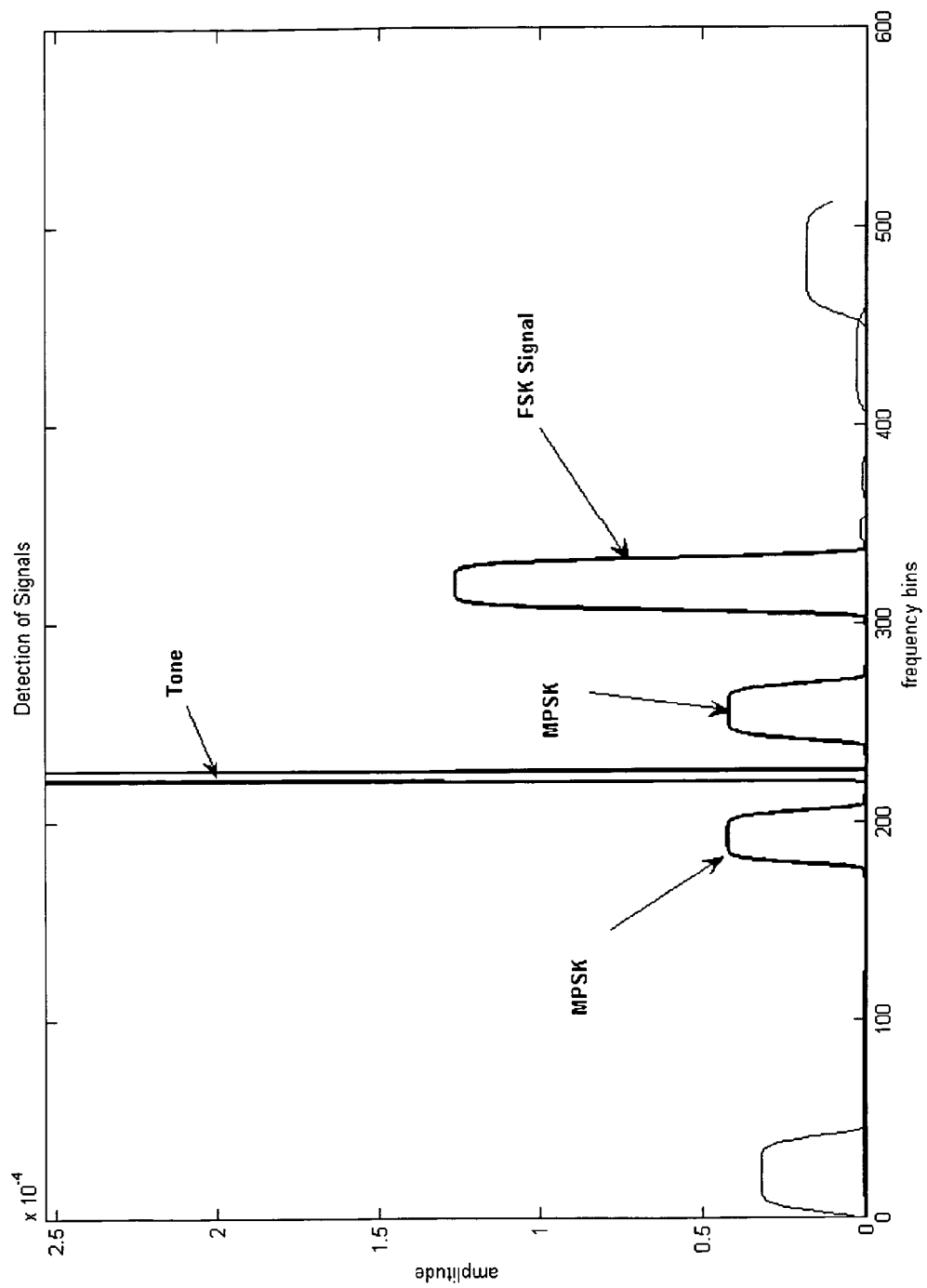
FIG. 5 depicts the detection of signals using a channel densities function.
Figure 6:
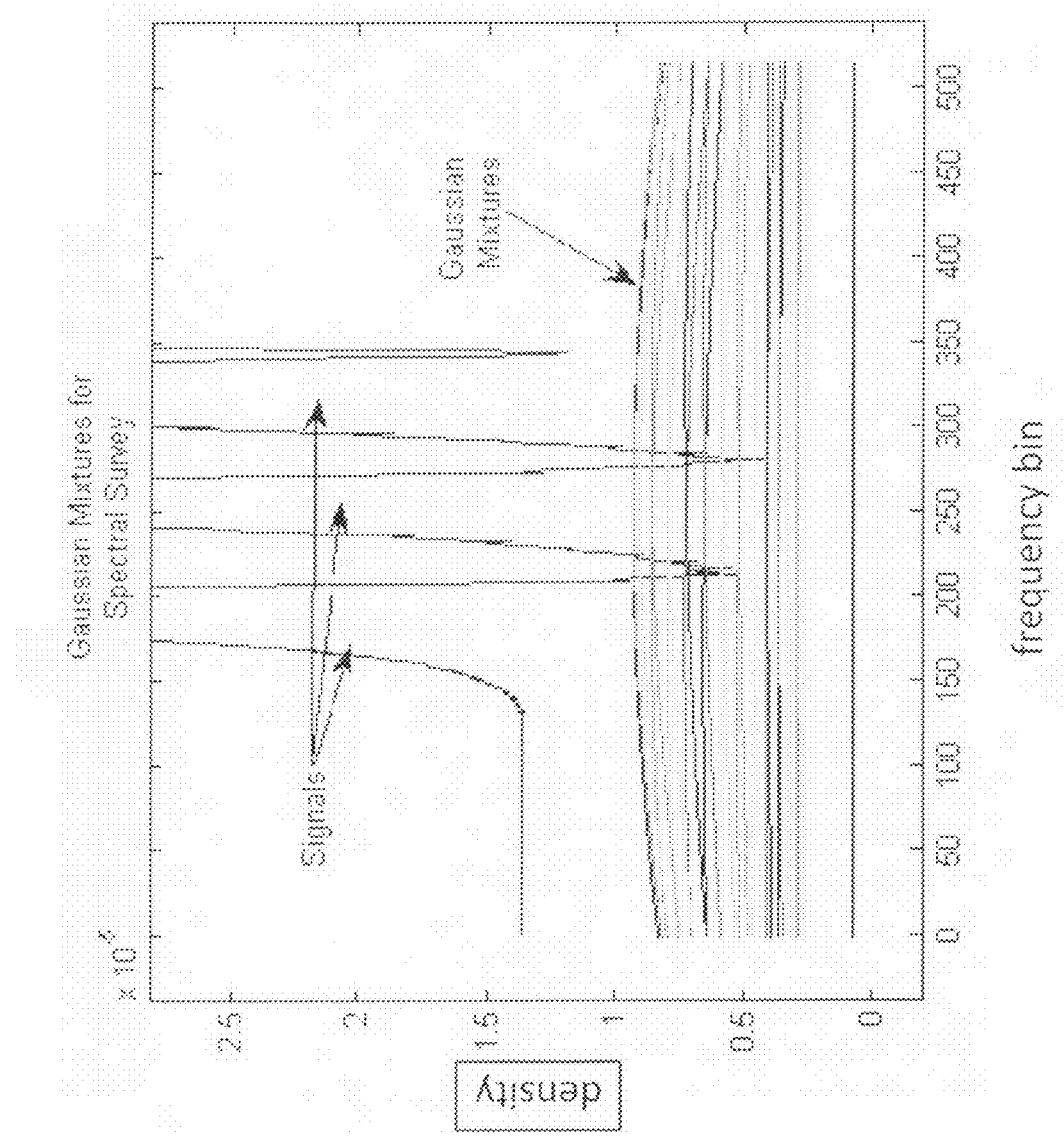
FIG. 6 depicts a desired Gaussian model for characterizing communications signals.
Figure 7:
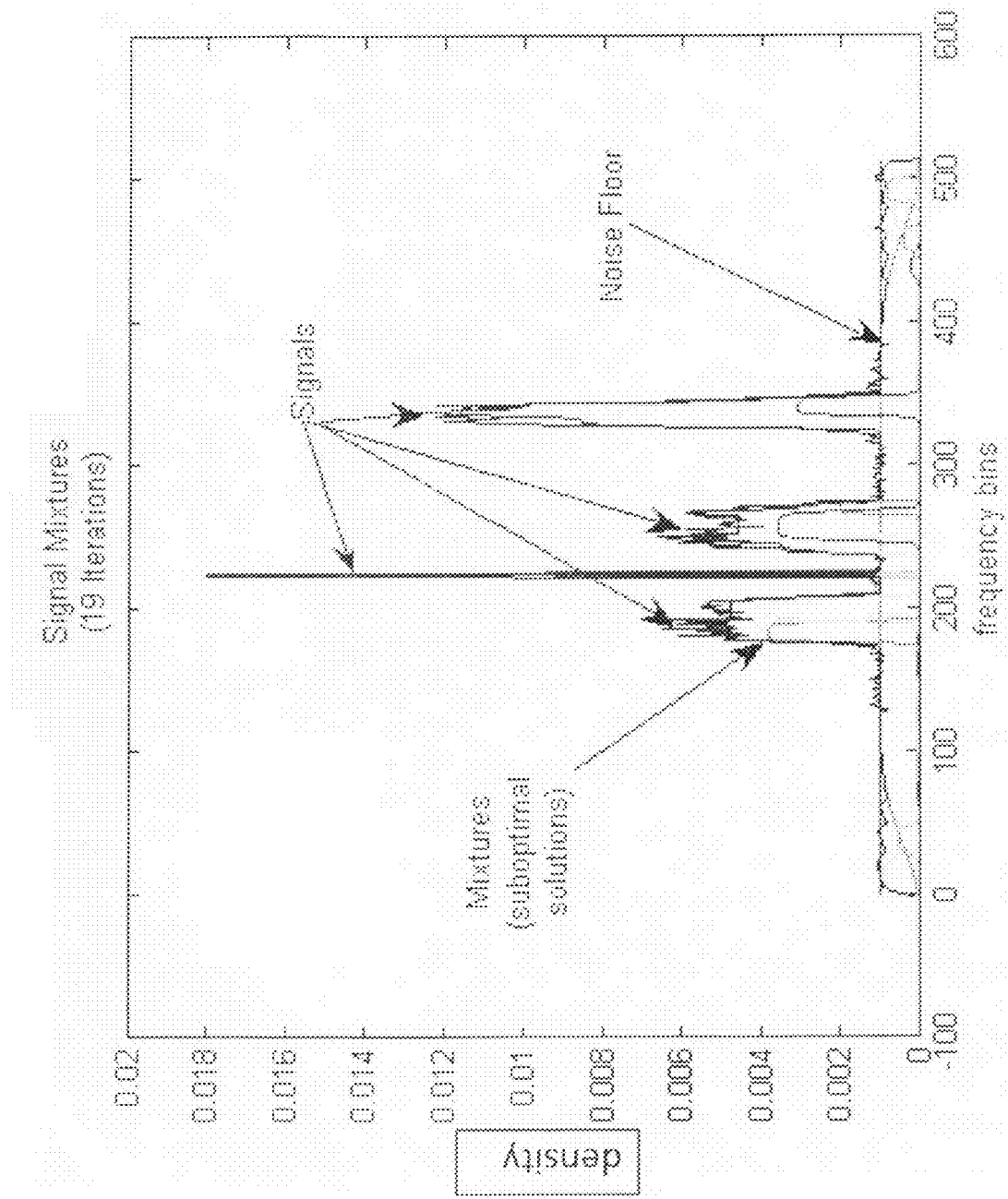
FIG. 7 depicts the spectral profile produced by the present invention using a novel probability density model tailored specifically for communications signal detection.

To recap, the process first calculates an initial expectation estimate 60. The next step is to calculate the updated parameters that maximize the expectation 70. At the completion of these two steps, the process applies rules to improve convergence 80. The rules control the value of the bandwidth of each mixture. One rule prevents the bandwidth of a mixture from taking small values. This feature is needed for detecting tone signals. Without this rule, the bandwidth may approach to zero and cause convergence problems [Eq. 16]. A second rule keeps one of the mixture elements with a wide bandwidth. This mixture is forced to converge to the noise floor of the broad spectrum. The feature is useful for estimating the noise in the receiver and can be used later for the estimation of the signal-to-noise ratio as depicted in FIG. 7.

Recombining Subbands

Rules for recombining channels 90 can be developed using thresholds on predefined quantities. An upper and lower frequency is defined for each sub-band. Lower cut-off frequency of the mixture i is $$(f_L)_i = f_i - b_i/2 \quad \text{Eq. 25}$$

The higher cut-off frequency of the mixture i is $$(f_H)_i = f_i + b_i/2 \quad \text{Eq. 26}$$

Also, a new feature is defined. The average amplitude level of the mixture i is:

$$(A)_i = p(y; \theta_i)/b_i \quad \text{Eq. 27}$$

The last feature allows prioritizing the search by processing the signals that have the higher amplitude.

The rules can be divided in two categories. One set of rules determines whether the sub-band falls inside another sub-band. A second rule will determine if two adjacent sub-bands are candidates for recombination. The rules assist in grouping the sub-bands that belong to a single signal in individual arrays. Once the sub-bands are grouped, they can be sent to a second algorithm that reconstructs the signal.

The reconstruction of the signal profile 100 is done by reconstructing the signal based on the individual mixture elements (sub-bands) within a group.

$$mix_{(i)}(y) = \sum_j p(y|z=i; \vec{\theta}) \cdot P(z=i; \vec{\theta}) \qquad \text{Eq. 28}$$

If the rules have been applied correctly, the reconstructed mixture element should have a clipped-Gaussian profile. With this in mind, the center frequency $f_c$ can be estimated by calculating the first moment.

$$f_c = \int mix_{(i)}(y) \cdot y \cdot dy \qquad \text{Eq. 29}$$

The bandwidth estimate b can be obtained by using a median filter or a second moment.

$$b = \int mix_{(i)}(y) \cdot (y-f_c)^2 \cdot dx \qquad \text{Eq. 30}$$

Additional Parameter Estimation

Energy, noise and SNR can be estimated once bandwidth and center frequency estimates have been produced by the algorithm.

$$E_b = \int |mix_{(i)}(y)|^2 \cdot dy \qquad \text{Eq. 31}$$

The noise estimate is calculated in a similar manner by processing an area where no signals are found. An alternative procedure is to estimate a wideband mixture element as illustrated in FIG. 7.

Tests Results

Referring to FIG. 8 depicts an actual signal spectrum reconstructed by the present invention. The present invention has been tested using MPSK, MFSK and tone signals with different frequency allocations and different noise levels. The signals were sampled at 16 kHz and each signal contains at least 400 cycles. The analysis filter used 256 channels. The signals were processed with a DCT/DST filter bank to generate in-phase and quadrature channels. The invention was able to identify the bands of interest and reconstruct the individual signals. The use of nearly perfect reconstruction filters allows us to resample and downconvert the signals by adding or shifting channels. The frequency and bandwidth estimates were verified by visual inspection and analysis. The center frequencies and bandwidths were in agreement with the original parameters. The estimated error of the center frequency and bandwidth is inversely proportional to the number of channels in the filter banks.

Referring to FIG. 7 depicts actual results of the present invention sorted by the normalized energy density. The four most significant signals are shown below. These results correspond to the reconstructed signal spectrum in FIG. 8.

While the present invention has been described in reference to specific embodiments, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

What is claimed is:

1. A computer-based method for detecting and characterizing frequency spectrum activity utilizing a set of software program instructions stored on a non-transitory computer-readable media, wherein said instructions, when executed by a computer, perform the necessary steps for:

overestimating a number of mixture elements i=1, 2, . . . , K;

initializing a parameter vector $\vec{\theta}(i) = [\alpha_i \, f_i \, b_i]$ of each said mixture element i uniformly across the frequency spectrum;

initializing a prior probability $\hat{p}(y_j|z_j=1; \vec{\theta}(i))$ and a mixture probability $P(z_j=i; \vec{\theta}_c)$ of an expectation;

inputting a spectral sample comprising a frequency bin and an amplitude having the form of data vector $\vec{y}$ and weight vector $\vec{w}$ respectively;

updating said parameter vectors until a convergence occurs, comprising the steps of;

calculating said expectation (E-step);

updating said parameter vectors (M-step);

applying rules to constrain bandwidth of said expectation;

iterating said steps of calculating, updating and applying rules;

recombining suboptimal solutions;

eliminating trivial solutions; and reconstructing a signal profile.

2. Method of claim 1 wherein said signal profile is defined as:

$$p(y,z|\vec{\theta}) = p(y|z;\vec{\theta}) \cdot P(z;\vec{\theta}) = \frac{N}{b \cdot \Gamma\left(\frac{1}{N}\right)} \exp\left(-\left(\frac{y-f}{b/2}\right)^N\right) \cdot \alpha$$

Where, N>2, N is even, $\alpha = P(z; \vec{\theta})$, $1 \geq \alpha \geq 0$ and b>0.

3. Said method of claim 2 wherein said step of calculating said expectation further comprises the step of calculating a posteriori probability (E-step) according to the equations:

$$\hat{p}(y_j|z_j=k;\vec{\theta}) \equiv \frac{1}{w_j}\sum_m p(y'_m \subseteq y_j|z'_j=k;\vec{\theta})$$

$$\sum_m p(z_j=i|y'_m \subseteq y_j; \vec{\theta}_c) = \frac{\hat{p}(y_j|z_j=i;\vec{\theta}_c)P(z_j=i;\vec{\theta}_c)}{\sum_{k=1}^{K}\hat{p}(y_j|z_j=k;\vec{\theta}_c) \cdot P(z_j=k;\vec{\theta}_c)}$$

$$p(z_j=i|y_j;\vec{\theta}_c) \equiv \sum_m p(z_j=i|y'_m \subseteq y_j;\vec{\theta}_c).$$

4. Said method of claim 3 wherein said step of updating said parameters further comprises maximizing said expectation (M-Step) according to the equations:

$$Q(\vec{\theta}) = E_z\left\{\ln\left(\prod_{j=1}^{J} p(\vec{y}_j|\vec{z};\vec{\theta})^{w_j} \cdot P(\vec{z};\vec{\theta})^{w_j}\right)\Big|\vec{y}\right\}$$

-continued $$\nabla_{\vec{\theta}} Q(\theta) = 0 \rightarrow \frac{\partial Q(\vec{\theta})}{\partial \theta_i} = 0.$$

5. Said method of claim 4 wherein said step of maximizing the expectation comprises finding the roots of the derivative of said expectation according to the equations:

$$\frac{\partial Q(\vec{\theta})}{\partial f_i} = \sum_{j=1}^{J} p(z_j = i | y_j; \vec{\theta}_c) \cdot \left( -N \cdot w_j \cdot \frac{(y_j - f_i)^{N-1}}{(b_i/2)^N} \right) = 0$$

$$\frac{\partial Q(\vec{\theta})}{\partial b_i} = \sum_{j=1}^{J} p(z_j = i | y_j; \vec{\theta}_c) \cdot \left( \frac{1}{b_i} - 2N \cdot \frac{(y_j - f_i)^N}{(b_i/2)^{N+1}} \right) = 0$$

$$\frac{\partial Q(\vec{\theta})}{\partial \alpha_i} = \sum_{j=1}^{J} p(z_j = i | y_j; \vec{\theta}) \cdot \left( \frac{w_j}{p(z_j = i; \vec{\theta})} - \lambda \right) = 0$$

$$\alpha_i = \frac{\sum_{j=1}^{J} p(z_j = i | y_j; \vec{\theta}_c) \cdot w_j}{\sum_{k=1}^{K} \sum_{j=1}^{J} p(z_j = k | y_j; \vec{\theta}_c) \cdot w_j}.$$

6. Method of claim 1 wherein said step of applying rules further comprises the steps of:
applying a first rule to mixture elements to improve the detection of tones by constraining the size of the bandwidth to non-zero values; and
applying a second rule to mixture elements that retains at least one wide bandwidth element so as to detect a noise floor.

7. Method of claim 1 wherein said step of recombining further comprises the steps of:
defining a lower cut-off frequency $(f_L)_i = f_i - b_i/2$;
defining a higher cutoff frequency $(f_H)_i = f_i + b_i/2$;
defining an average amplitude quantity $(A)_i = p(y; \theta_i)/b_i$ for each sub band i; and
defining thresholds for recombining adjacent sub bands in terms of previous quantities $\|(f_L)_i - (f_H)_{i-1}\| < \epsilon_{i,1}$ and $\|(A)_i - (A)_{i-1}\| < \epsilon_{i,2}$.

8. Method of claim 1 wherein said step of reconstructing further comprises the steps of:
computing a new parameter vector $\vec{\theta}_{band}(i)$ as function of the sub band parameter vector and its thresholds according to:

$$\vec{\theta}_{band}(i) = f(\vec{\theta}; \epsilon);$$

computing the band profile $\text{mix}_{(i)}(y)$ according to:

$$\text{mix}_{(i)}(y) = p(y, z = i | \vec{\theta}_{band}(i))$$

computing the center frequency $f_c$ according to:

$$f_c = \int \text{mix}_{(i)}(y) \cdot y \cdot dy;$$

computing the bandwidth b according to:

$$b = \int \text{mix}_{(i)}(y) \cdot (y - f_c)^2 \cdot dx; \text{ and}$$

computing the average energy $E_b$ according to:

$$E_b = \int |\text{mix}_{(i)}(y)|^2 \cdot dy.$$

* * * * *